(12) United States Patent
Bishop

(10) Patent No.: US 9,279,500 B2
(45) Date of Patent: Mar. 8, 2016

(54) ROTARY FACE SEAL ASSEMBLY

(71) Applicant: Caterpillar Inc., Peoria, IL (US)

(72) Inventor: Bradford Bishop, Franklin, NC (US)

(73) Assignee: Caterpillar Inc., Peoria, IL (US)

( * ) Notice: Subject to any disclaimer, the term of this patent is extended or adjusted under 35 U.S.C. 154(b) by 71 days.

(21) Appl. No.: 13/870,695

(22) Filed: Apr. 25, 2013

(65) Prior Publication Data

US 2013/0285332 A1     Oct. 31, 2013

Related U.S. Application Data

(60) Provisional application No. 61/640,551, filed on Apr. 30, 2012.

(51) Int. Cl.
*F16J 15/34* (2006.01)
*B24B 1/00* (2006.01)

(52) U.S. Cl.
CPC . *F16J 15/34* (2013.01); *B24B 1/00* (2013.01); *F16J 15/344* (2013.01); *F16J 15/3496* (2013.01)

(58) Field of Classification Search
CPC ................................. F16J 15/344; F16J 15/38
See application file for complete search history.

(56) References Cited

U.S. PATENT DOCUMENTS

| | | | |
|---|---|---|---|
| 3,180,648 A | 4/1965 | Kupfert et al. | |
| 3,241,843 A | 3/1966 | Hatch et al. | |
| 3,322,431 A | 5/1967 | Solari | |
| 3,403,916 A | 10/1968 | Durham et al. | |
| 3,540,743 A | 11/1970 | Ashton et al. | |
| 3,946,859 A | 3/1976 | Jeffrey et al. | |
| 3,978,935 A | 9/1976 | Dauwalder | |
| 3,985,366 A | 10/1976 | Plouzek | |
| 4,077,634 A | 3/1978 | Durham | |
| 4,087,100 A * | 5/1978 | Yoshihashi et al. | 277/399 |
| 4,189,159 A | 2/1980 | Domes et al. | |
| 4,351,533 A | 9/1982 | Moore | |
| 4,380,412 A * | 4/1983 | Walsh | 409/314 |
| 4,514,014 A | 4/1985 | Balzer | |
| 4,753,304 A | 6/1988 | Kelly, Jr. | |
| 4,844,483 A | 7/1989 | Iijuma et al. | |
| 5,472,058 A | 12/1995 | Hooper | |
| 6,109,376 A * | 8/2000 | Pearce | 175/371 |
| 6,550,778 B1 | 4/2003 | Zutz | |
| 6,609,953 B2 | 8/2003 | Ederyd et al. | |
| 7,452,134 B2 | 11/2008 | Burner et al. | |

(Continued)

FOREIGN PATENT DOCUMENTS

EP       1398549 B1    6/2005
WO    WO 2010/015223 A1    2/2010

*Primary Examiner* — Gilbert Lee
(74) *Attorney, Agent, or Firm* — Leydig, Voit & Mayer, Ltd.

(57) ABSTRACT

A seal assembly, adapted to seal a joint having a first member pivotable about a rotational axis relative to a second member thereof, includes first and second annular seal rings and first and second annular load rings. The first and second seal rings each has a loading surface, extending axially, and a sealing face, extending radially to an outer perimeter. Each sealing face has a sealing band disposed adjacent the outer perimeter. The first and second seal rings abut one another such that the sealing bands of the first and second seal rings are in contacting relationship with each other. The first and second load rings engage the loading surface of the first and second seal rings, respectively. Each sealing band is brush polished such that it has a surface roughness average of about 0.08 micrometers Ra or less.

19 Claims, 8 Drawing Sheets

(56) References Cited

U.S. PATENT DOCUMENTS

| | | |
|---|---|---|
| 7,731,307 B1 | 6/2010 | Freeman |
| 7,946,661 B1 | 5/2011 | Freeman |
| 7,997,659 B2 | 8/2011 | Oertley et al. |
| 2002/0115382 A1 | 8/2002 | Luthy |
| 2003/0106358 A1 | 6/2003 | Luthy |
| 2003/0177804 A1 | 9/2003 | Luthy |
| 2006/0022411 A1 | 2/2006 | Beardsley et al. |
| 2007/0133915 A1 | 6/2007 | Burner et al. |
| 2007/0154737 A1* | 7/2007 | Itoh et al. ............ 428/698 |
| 2009/0022973 A1* | 1/2009 | Miyazawa ............ 428/304.4 |
| 2009/0079256 A1 | 3/2009 | Oertley et al. |
| 2010/0209180 A1 | 8/2010 | Hasselbusch et al. |
| 2012/0248706 A1* | 10/2012 | Hoppe et al. ............ 277/399 |
| 2014/0175753 A1* | 6/2014 | Antoine ............ 277/358 |

* cited by examiner

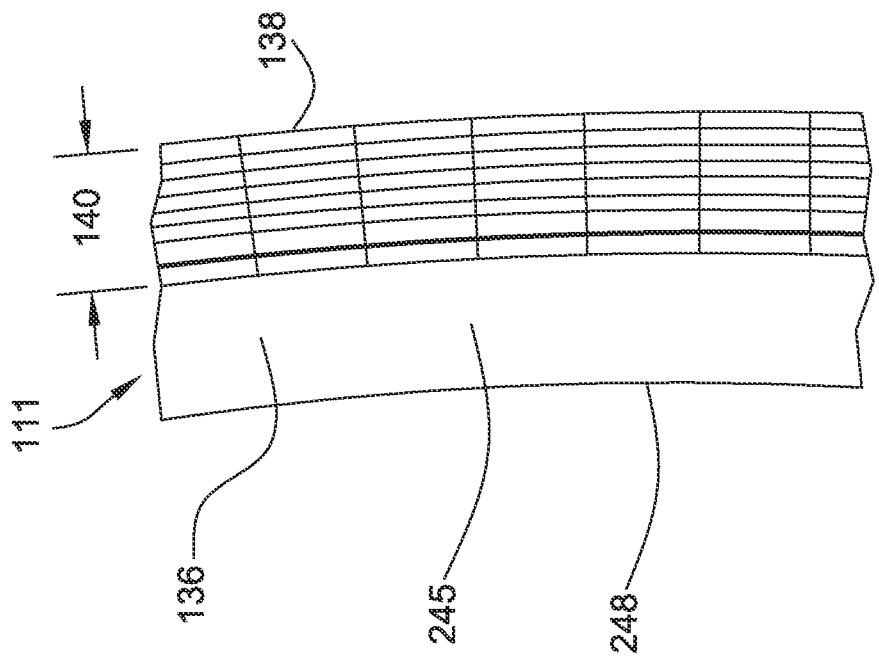
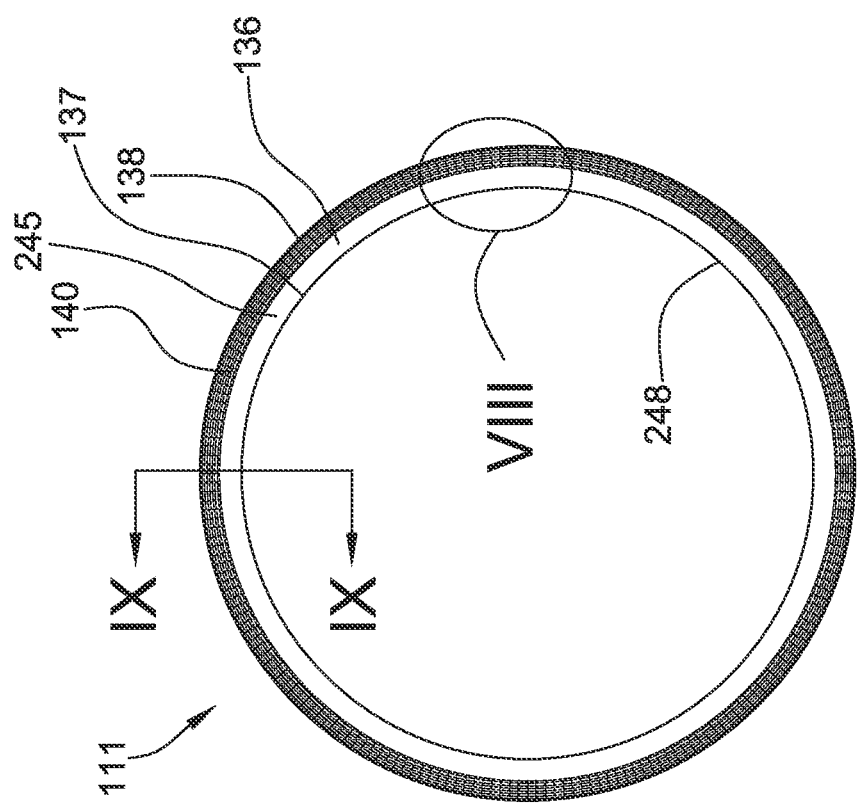
FIG. 7
FIG. 8

ROTARY FACE SEAL ASSEMBLY

CROSS-REFERENCE TO RELATED APPLICATION

This patent application claims the benefit of priority to U.S. Patent Application No. 61/640,551, filed Apr. 30, 2012, and entitled "Rotary Face Seal Assembly," which application is incorporated in its entirety herein by this reference.

TECHNICAL FIELD

This patent disclosure relates generally to a seal assembly for machinery and equipment and, more particularly, to a seal assembly having a rotary face.

BACKGROUND

A seal assembly of the kind employed for retaining lubricant in and excluding foreign matter from the vicinity of bearing surfaces between relatively moving parts can comprise a face-type seal wherein sealing is accomplished by mating surfaces of relatively rotating seal parts of hard material. In seals which employ two rings of metal or other hard material relatively rotating in face-to-face contact, the production of sealing surfaces which will endure and maintain a seal throughout many hours of severe service is highly desired.

In a conventional finishing process, the sealing surface is made so that it is fairly flat. The sealing surface is then lapped with alumina grit (e.g. 15 micron). In some instances, the lapped sealing surface is polished with very fine sandpaper (e.g. 600-1200 grit alumina paper). The final polishing step can be time consuming and costly. In some instances, the final polishing step is skipped, and the manufacturer relies upon the mating sealing surfaces of the seal assembly self-honing during service. This "break-in period" can result in a joint with some initial leakage that may be unacceptable.

Commonly-owned U.S. Pat. No. 3,180,648 is entitled, "Seals." The '648 patent describes a method for finishing seal rings of a seal assembly. The seal rings are made with their abuttable surfaces flat, or substantially flat. They are then rough lapped with their abuttable faces against a large rotating lapping table which has a spherical contour to form relieved areas for seal band reforming. This is followed by a fine lap. The rings can then be subjected to a flat lap with a compound of the same grade as the second lap to roughly form the flat sealing band. This band is then finished to a slightly conical configuration by lapping it for a brief period of time with an apparatus that comprises a circular table freely rotatable as on a spindle and having a raised annular lapping surface. The annular lapping surface is a concave lap surface in the form of a frustum of an internal cone but so shallow that its outer margin is only approximately 0.005 inch higher than its inner margin. The seal ring to be lapped is held in a chuck or adapter, the inner periphery of which is inclined to correspond to the incline which supports the torus and the seal ring in service. A torus identical to the torus used in service is employed in the apparatus. The seal ring is then rotated against the lapping surface and under pressure comparable to, and preferably substantially the same as, the pressure to which it is subjected in service.

It will be appreciated that this background description has been created by the inventor to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a seal assembly adapted for use in sealing a joint having a first member pivotable about a rotational axis relative to a second member thereof. The seal assembly includes first and second annular seal rings and first and second annular load rings.

Each of the first and second seal rings has a loading surface, which extends axially, and a sealing face, which extends radially to an outer perimeter. Each sealing face has a sealing band disposed adjacent the outer perimeter. The first and second seal rings abut one another such that the sealing bands of the first and second seal rings are in contacting relationship with each other. The first load ring engages the loading surface of the first seal ring, and the second load ring engages the loading surface of the second seal ring. Each sealing band is brush polished such that the sealing band has a surface roughness average of about 0.08 micrometers Ra or less.

In other embodiments, a seal ring for a seal assembly includes a cylindrical body and a sealing flange. The cylindrical body extends axially between a load end and an opposing seal end. The sealing flange is disposed adjacent the seal end of the cylindrical body. The sealing flange projects radially from the cylindrical body to an outer perimeter thereof. The sealing flange includes a sealing face. The sealing face has a sealing band disposed adjacent the outer perimeter of the sealing flange and an inner relieved area disposed between the sealing band and an inner perimeter of the sealing face. The sealing band is brush polished such that the sealing band has a surface roughness average of about 0.08 micrometers Ra or less.

In still other embodiments, a method for preparing a seal ring for a seal assembly is described. The seal ring is machined to at least one predetermined tolerance. A sealing face of the seal ring is lapped to define an inner relieved area. The sealing face of the seal ring is lapped to flatten a sealing band. The sealing band is polished with a brush such that the sealing band has a surface roughness average of about 0.08 micrometers Ra or less.

Further and alternative aspects and features of the disclosed principles will be appreciated from the following detailed description and the accompanying drawings. As will be appreciated, the seal rings for a seal assembly, seal assemblies, and methods for preparing a seal ring for a seal assembly disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 7 is an axial end view of a seal ring of the seal assembly of FIG. 4.

FIG. 8 is an enlarged, fragmentary view of the seal ring of FIG. 7 corresponding to the location encompassed by circle VIII in FIG. 7.

DETAILED DESCRIPTION

Embodiments of a seal assembly, a seal ring for a seal assembly, and a method for preparing a seal ring for a seal assembly are described herein. In embodiments, a seal ring for a seal assembly can include a sealing face having a sealing band disposed adjacent an outer perimeter thereof. The sealing band can be substantially flat in cross-section between an inner radial edge and the outer perimeter. The sealing band can be brush polished such that the sealing band has a consistent surface finish with a surface roughness average of about 0.08 micrometers Ra or less. The sealing face can include an inner relieved area which is tapered between the sealing band and an inner perimeter of the seal ring. The relieved area and the sealing band can have a radius therebetween. The radius can be a substantially consistent radius from taper angle of the inner relieved area to the flat sealing band. The outer perimeter can be substantially free of burrs.

The sealing face of the seal ring can be prepared without the use of a sandpaper polishing step. The sealing face can be polished using a suitable brush technique, such as by using a machine commercially-available from Gerber Maschinenbau of Switzerland.

Figure 1:
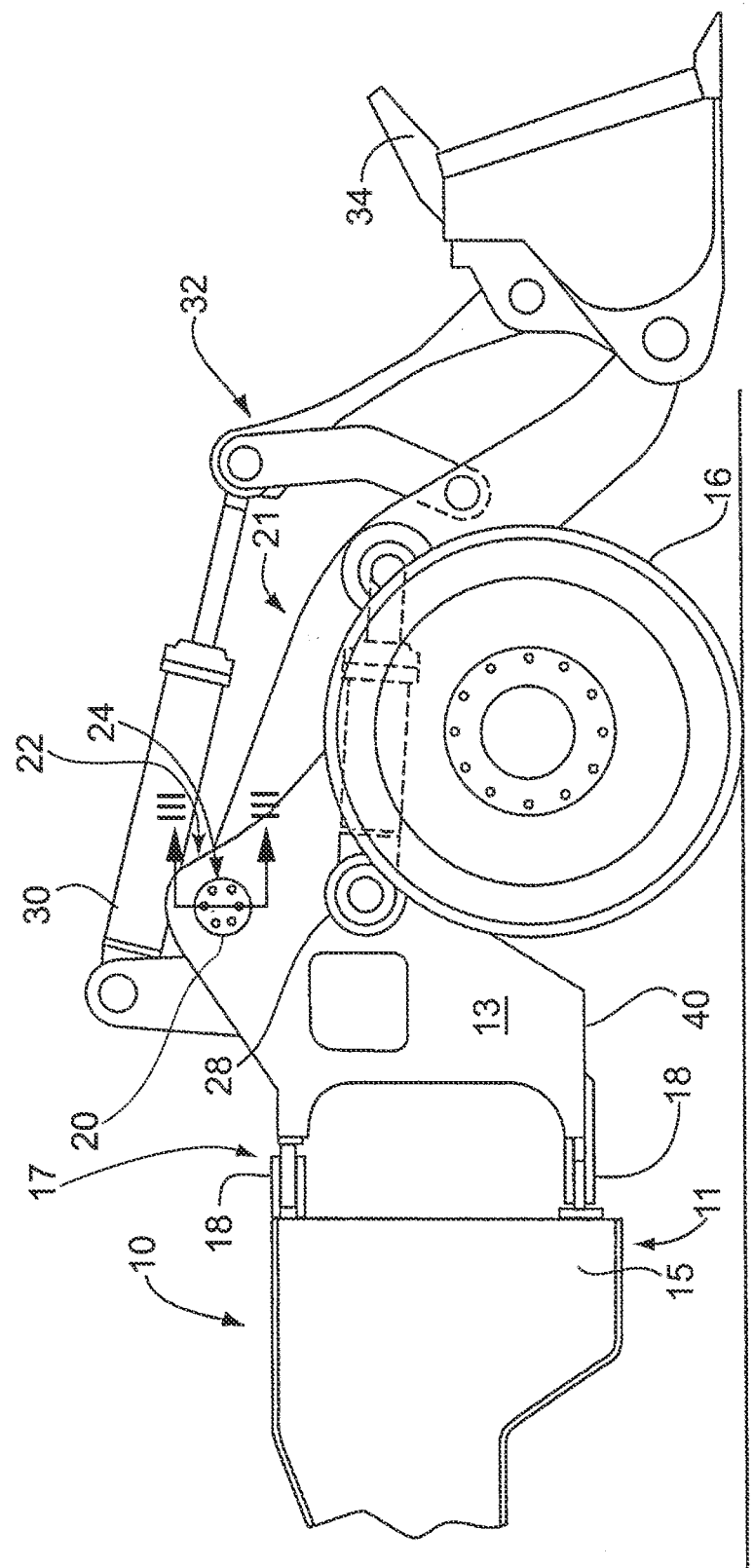
FIG. 1 is a fragmentary, side elevational view of an embodiment of a machine having a pin joint with a seal assembly in accordance with principles of the present disclosure connecting a lift arm to a non-engine end.

Referring now to the drawings and in particular to FIG. 1, a machine 10 in the form of a wheel loader is shown. It should be understood, however, that many other types of machines such as backhoes, excavators, material handlers and the like, and other types of equipment that include pivotal linkage arrangements can utilize a seal ring, a seal assembly, and a joint having a seal assembly constructed in accordance with principles of the present disclosure. Examples of other such machines include machines used for compaction, mining, construction, farming, transportation, etc.

The machine 10 has a frame 11 with a front portion 13 and a rear portion 15. A plurality of ground-engaging members 16 (e.g., wheels, tracks, etc.) one of which is shown, can be connected to the front portion 13 and the rear portion 15 of the structural frame through axles, drive shafts or other components (not shown). A hitch arrangement 17 pivotally connects the front portion 13 to the rear portion 15 by way of a pair of hinge joints 18. The rear portion 15 of the frame 11 can support, for example, a power source (e.g., an engine) and cooling system components (not shown), the power source being operatively connected through a drive train (not shown) to drive at least one ground engaging device 16 (such as, a plurality of wheels, as shown) for movement of the machine 10.

The front portion 13 of the frame 11 has a first member 20 engaged therewith, such as by frame members or flanges in spaced relationship to each other, for example. A component, in the form of a lift arm assembly or boom 21, for example, has a second member 22 engaged therewith and is pivotally connected to the front portion 13 of the frame 11 by a pin joint assembly 24. The pivotal connection provided by the pin joint assembly 24 allows the second member 22 of the boom 21 to be pivotable about a rotational axis defined by the pin joint assembly 24 relative to the first member 20 of the frame 11.

A lift cylinder 28 is pivotally connected between the front portion 13 of the frame 11 and the boom 21. A tilt cylinder 30 is connected between the front portion 13 and a linkage arrangement 32. The boom 21, the lift cylinder 28, the tilt cylinder 30 and the linkage arrangement 32 can raise, lower and angle an attached implement 34, such as a bucket, during loading and unloading operations, for example.

Figure 2:
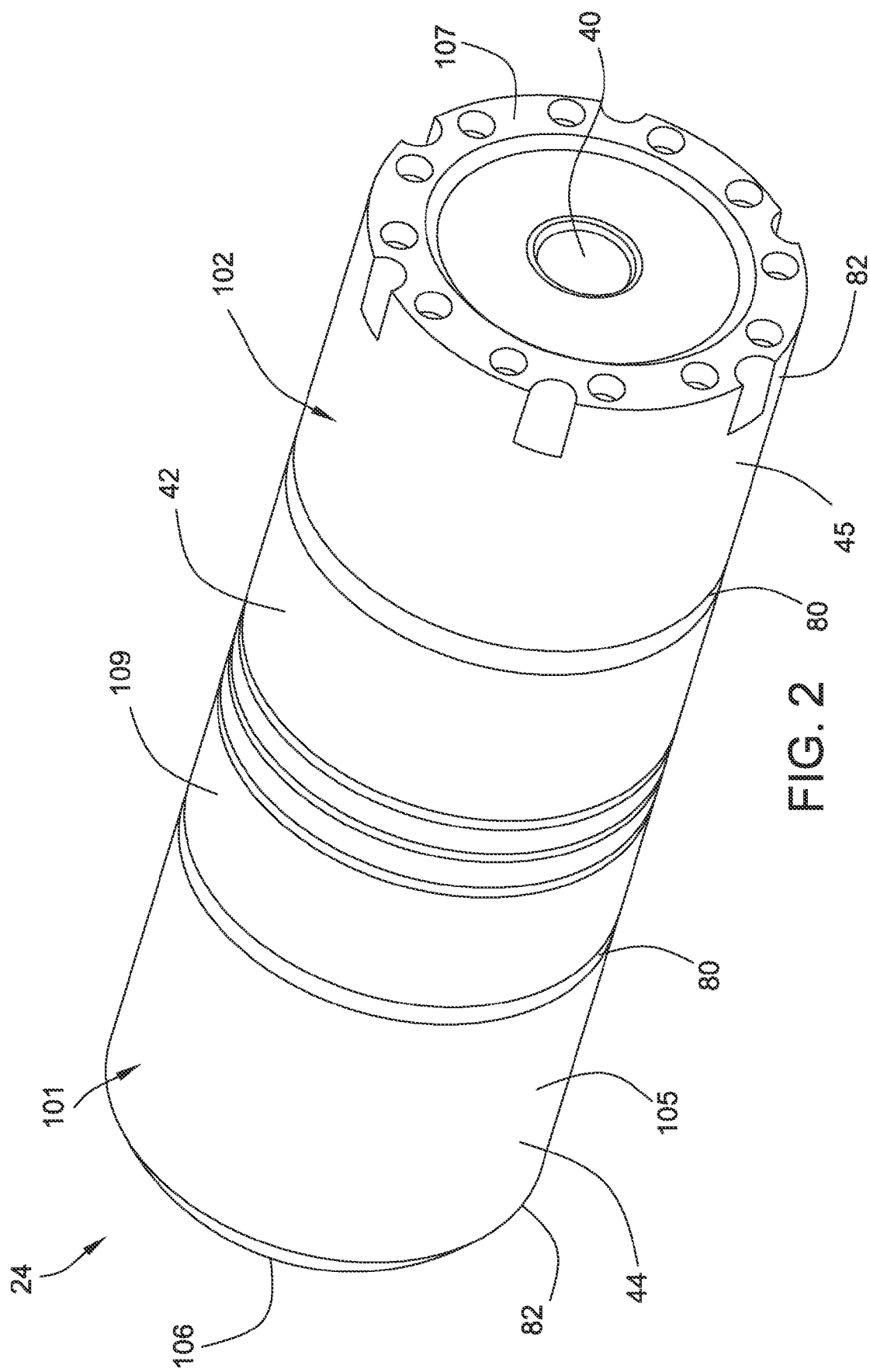
FIG. 2 is a perspective view of the pin joint of FIG. 1.
Figure 3:
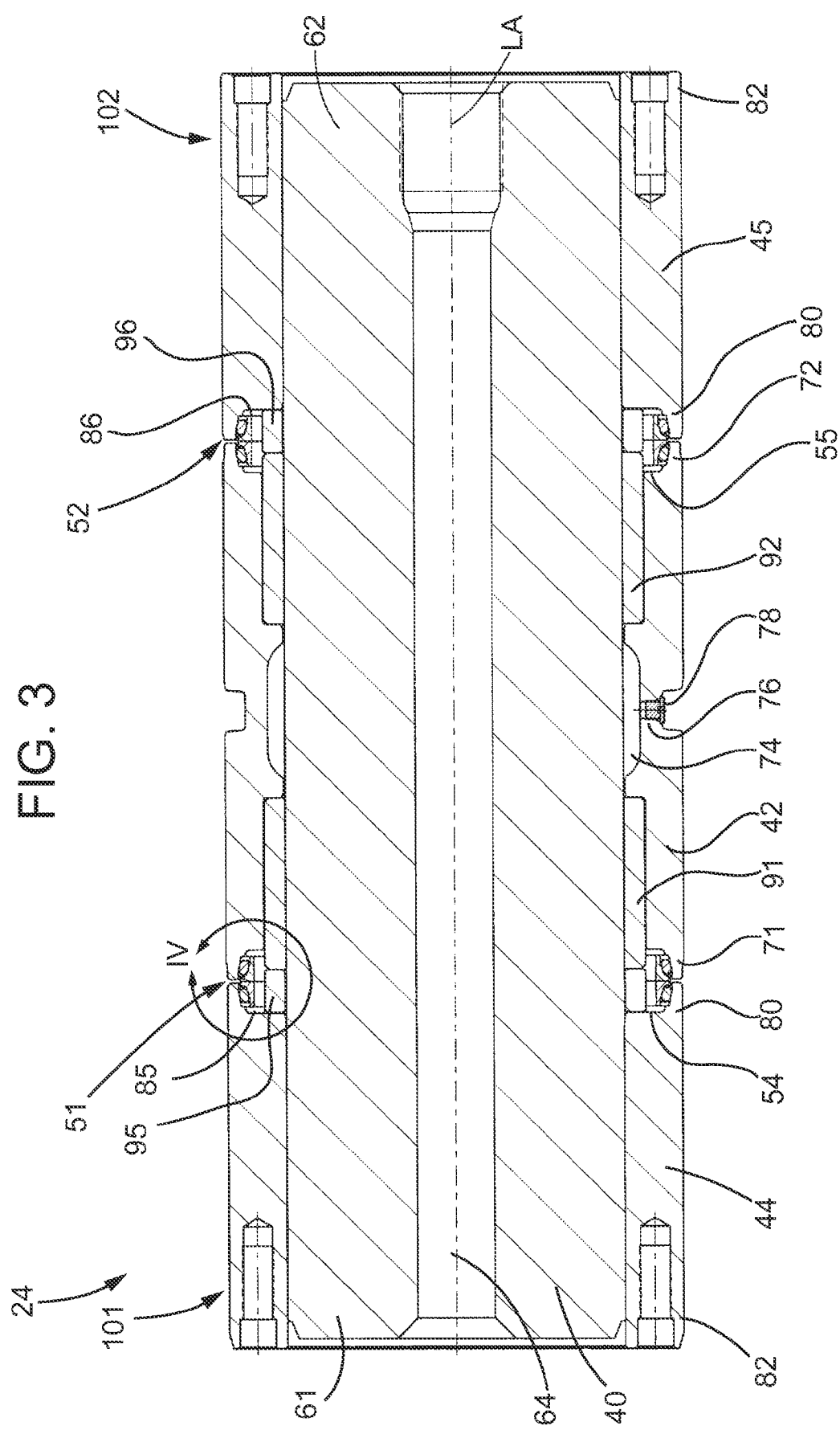
FIG. 3 is a cross-sectional view of the pin joint taken along line III-III in FIG. 1.

Referring to FIGS. 2 and 3, the pin joint assembly 24 includes a pin 40 extending through a bushing 42 and first and second collars 44, 45. The pin 40 defines a longitudinal axis "LA." The bushing 42 is intermediately disposed along the longitudinal axis "LA" between the first and second collars 44, 45.

In some embodiments, the first member 20 can comprise the first collar 44 and the second member 22 can comprise the bushing 42 which are both coaxial with the pin 40 about the longitudinal axis "LA." The second member 22 in the form of the bushing 42 is pivotable about the longitudinal axis "LA" with respect to the first member 20 in the form of the first collar 44 and with respect to the pin 40. It should be understood, however, that the use of the terms "first," "second," and the like herein is for convenient reference only and is not limiting in any way.

Referring to FIG. 3, a first seal assembly 51 and a second seal assembly 52, which are in the form of metal-to-metal face seal assemblies, are respectively disposed in a first seal cavity 54 axially extending between the first collar 44 and the bushing 42 and a second seal cavity 55 axially extending between the bushing 42 and the second collar 45. The bushing 42 is rotatable about the longitudinal axis "LA" relative to the pin 40 and the first and second collars 44, 45 with the first and second seal assemblies 51, 52 constructed according to principles of the present disclosure, respectively, providing running seals therebetween. In other embodiments, a seal assembly constructed according to principles of the present disclosure can be used in other applications, as will be recognized by one skilled in the art.

The pin 40 includes opposing first and second end portions 61, 62. The pin 40 includes an axial bore 64 coaxially arranged with the longitudinal axis "LA." The axial bore 64 can be sized to accommodate a mounting element therethrough, such as a draw bolt, for example.

The bushing 42 includes opposing first and second end portions 71, 72. The bushing 42 is coaxial with the pin 40 about the longitudinal axis "LA." The bushing 42 defines a cavity 74 for receiving lubricant (not shown) which is substantially centrally disposed. The cavity 74 is adapted to be filled with oil for lubricating the rotating interfaces of the pin joint assembly 24. In this regard, a threaded opening 76 is plugged with a removable threaded plug 78 to allow lubricant to be added to the cavity 74.

The first and second collars 44, 45 respectively engage the first and second end portions 61, 62 of the pin 40 and are adapted to be rotatively coupled with the pin 40. The first and second collars 44, 45 are annular in shape and coaxial with the pin 40 about the longitudinal axis "LA." The first and second collars 44, 45 each have an inner portion 80 and an outer portion 82. The inner portion 80 of each of the first and second collars 44, 45 is oriented in proximal relation to the first and second end portions 71, 72 of the bushing 42, respectively. The outer portion 82 of each of the first and second collars 44, 45 is oriented in outward distal relation to the first and second end portions 71, 72 of the bushing 42, respectively.

The first end portion 71 of the bushing 42, the inner portion 80 of the first collar 44, and the pin 40 cooperate to define the first seal cavity 54 and a first channel 85, which is substantially annular, for receiving lubricant (not shown). Similarly, the second end portion 72 of the bushing 42, the inner portion 80 of the second collar 45, and the pin 40 cooperate to define the second seal cavity 55 and a second channel 86, which is substantially annular, also for receiving lubricant (not shown).

First and second sleeve bearings 91, 92 can be provided which are annular in shaped and coaxial with the pin 40 about the longitudinal axis "LA." The first and second sleeve bearings 91, 92 engage the pin 40 and respectively engage the first and second end portions 71, 72 of the bushing 42.

First and second thrust rings 95, 96 can be provided which are coaxial with the pin 40 about the longitudinal axis "LA." The first and second thrust rings 95, 96 respectively reside in first and second channels 85, 86, which are substantially annular. The first and second thrust rings 95, 96 are oriented in spaced-apart relation relative to the bushing 42.

The first thrust ring 95 engages the pin 40 between the inner portion 80 of the first collar 44 and the first sleeve bearing 91. The second thrust ring 96 engages the pin 40 between the inner portion 80 of the second collar 45 and the second sleeve bearing 92. The first and second thrust rings 95, 96 can intermittently or continuously engage the first and second sleeve bearings 91, 92, respectively, during use of the pin joint assembly 24.

The first and second seal assemblies 51, 52 are respectively disposed in the first and second seal cavities 54, 55 and are coaxial with the pin 40 about the longitudinal axis "LA." The first and second seal assemblies 51, 52 allow the bushing 42 to rotate with respect to the first and second collars 44, 45 and maintain a sealing relationship between the first and second collars 44, 45 and the bushing 42 such that the first and second channels 85, 86 for receiving lubricant can substantially retain lubricant housed therein.

The first collar 44, the first thrust ring 95, the first sleeve bearing 91, and the first seal assembly 51 comprise a first subassembly 101 of the pin joint assembly 24. The second collar 45, the second thrust ring 96, the second sleeve bearing 92, and the second seal assembly 52 comprise a second subassembly 102 of the pin joint assembly 24.

The first and second seal assemblies 51, 52 are substantially identical to each other. Furthermore, the first and second subassemblies 101, 102 are substantially identical to each other. It should be understood, therefore, that the description of one seal assembly is applicable to the other seal assembly and the description of one subassembly is applicable to the other subassembly, as well.

Referring to FIG. 2, the pin joint assembly 24—including the pin 40, the bushing 42, and the first and second subassemblies 101, 102—can be provided in a cartridge 105 in order to ease maintenance and/or replacement of the pin joint assembly 24. The cartridge 105 is substantially cylindrical but can be configured such that it tapers slightly radially inwardly in outer diameter from the outer portion 82 of one of the first and second collars 44, 45 (the second collar 45, e.g.) to the outer portion 82 of the other of the first and second collars 44, 45 (the first collar 44, e.g.). In other embodiments, the cartridge 105 can taper in the opposite direction. In yet other embodiments, the cartridge 105 can taper in outer diameter from each distal end portion 106, 107 of the cartridge 105 to a central cylindrical region 109 thereof. For example, in one embodiment, the first and second collars 44, 45 can taper inwardly in outer diameter from the inner portion 80 to the outer portion 82, and the bushing 42 can be substantially cylindrical. The tapered outer diameter of the cartridge 105 can be provided to help allow the cartridge 105 to be installed by swaging, but any alternative structures or features that enable secure installation of the cartridge 105 can be utilized in other embodiments.

In other embodiments, such as in those situations where the application and environment in which the pin joint assembly is employed so warrant, the pin joint assembly 24 can include only one of the first and second subassemblies 101, 102, in which case only the corresponding end portion of the pin 40 and end portion of the bushing 42 may be provided with a subassembly—that is, a collar, a thrust ring, a sleeve bearing, and a seal assembly. In such instances, the opposing end portion of the pin 40, and the corresponding end portion of the bushing 42 in proximal relation thereto, not being provided with all elements of a subassembly, may be provided with no elements of a subassembly or some elements of a subassembly. For instance, by way of example and not by way of limitation, if the first end portion 61 of the pin 40 and the first end portion 71 of the bushing 42 are provided with the first subassembly 101, the second end portion 62 of the pin 40 and the second end portion 72 of the bushing 42 may be provided with only the second sleeve bearing 92 and the second seal assembly 52 and omitting the second collar 45 and the second thrust ring 96.

Figure 4:
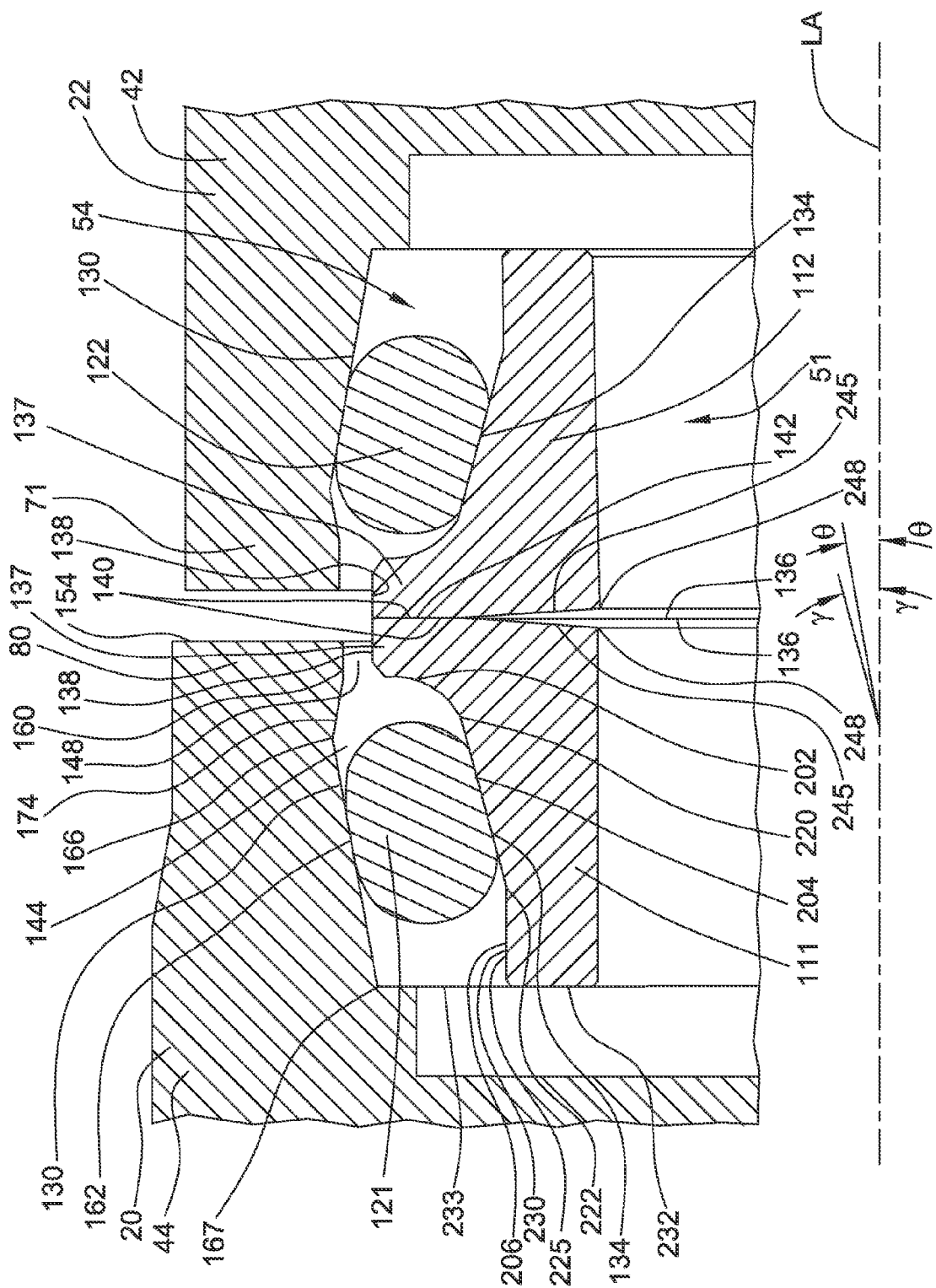
FIG. 4 is an enlarged, fragmentary view, in section, of the seal assembly of FIG. 1 corresponding to the location encompassed by circle IV in FIG. 3.

Referring to FIG. 4, the first seal assembly 51 is disposed in the first seal cavity 54 between the first member 20 in the form of the first collar 44 and the second member 22 in the form of the bushing 42. The first seal assembly 51 includes first and second seal rings 111, 112 and first and second load rings 121, 122, which are all annular. The first and second seal rings 111, 112 of the first seal assembly 51 are disposed in abutting relationship with each other. The first and second load rings 121, 122 are respectively mounted to the first and second seal rings 111, 112. The first and second seal rings 111, 112 can be made from any suitable metal, such as, a metal alloy, including a suitable casting alloy (e.g., C6 nickel alloy, stellite iron alloy, or NiHard iron alloy), a steel suitable for forming (e.g., SAE 1074), or a steel suitable for forging (e.g., SAE 52100). The first and second load rings 121, 122 are preferably made from a suitable elastomeric material (e.g., nitrile, low temperature nitrile, hydrogenated nitrile (HNBR), silicone, or viton).

In the first seal assembly 51, the first load ring 121 acts as a gasket and sealingly engages the first collar 44 and the first seal ring 111 to provide a fluid-tight seal therebetween. The second load ring 122 acts as a gasket and sealingly engages the bushing 42 and the second seal ring 112. As will be understood, therefore, in the second seal assembly 52, the first load ring 121 sealingly engages the second collar 45 and the first seal ring 111, and the second load ring 122 sealingly engages the bushing 42 and the second seal ring 112 to provide a fluid-tight seal therebetween.

The inner portion 80 of the first collar 44 is in proximal relation to the first end portion 71 of the bushing 42. The inner portion 80 of the first collar 44 and the first end portion 71 of the bushing 42 each includes a load ring engagement surface 130. The load ring engagement surfaces 130 of the first member 20 in the form of the first collar 44 and the second member 22 in the form of the bushing 42 define, at least in part, the first seal cavity 54, which extends axially and is interposed between the first member 20 and the second member 22. It will be understood that the second end portion 72 of the bushing 42 cooperates with the second collar 45 in a similar manner to define, at least in part, the second seal cavity 55, which extends axially and is interposed between the bushing 42 and the second collar 45.

The load ring engagement surfaces 130 are generally annular and are coaxial with the longitudinal axis "LA." In the illustrated embodiment, the load ring engagement surfaces 130 maintain the cross-sectional shape shown in FIG. 4 substantially continuously around the entire circumference circumscribed around the longitudinal axis "LA."

The first and second seal rings 111, 112 are substantially identical to each other. The first and second seal rings 111, 112 are each in the form of an annulus. The first and second seal rings 111, 112 each has a ramped or inclined loading surface 134, which is axially extending, and a sealing face 136, which is radially-extending. The sealing face 136 is defined by a sealing flange 137, which is radially-extending. The sealing faces 136 of the first and second seal rings 111, 112 form a radially-extending annulus and are in sealing relationship with each other.

Each sealing face 136 extends radially to an outer perimeter 138. Each sealing face 136 has a sealing band 140 disposed adjacent the outer perimeter 138. The first and second seal rings 111, 112 abut one another such that the sealing bands 140 of the first and second seal rings 111, 112 are in contacting relationship with each other. Each sealing band 140 is brush polished such that the sealing band 140 has a surface roughness average of about 0.08 micrometers Ra or less.

The first and second load rings 121, 122 resiliently support the first and second seal rings 111, 112, respectively. The first load ring 121 engages the inclined loading surface 134 of the first seal ring 111, and the second load ring 122 engages the inclined loading surface 134 of the second seal ring 112.

The first seal assembly 51 employs dual cones and the first and second seal rings 111, 112 with axial loading of the first and second seal rings 111, 112 along the longitudinal axis "LA" accomplished by means of the first and second load rings 121, 122. The tapered conical or inclined loading surfaces 134 are formed along the outside surface of the first and second seal rings 111, 112 to receive the first and second load rings 121, 122, respectively. The load ring engagement surfaces 130 are positioned in corresponding, confronting inclined relation with the inclined loading surfaces 134 of the first and second seal rings 111, 112 so as to contain the first and second load rings 121, 122, respectively, therebetween. Axial loading of the first and second seal rings 111, 112 is thus accomplished through the axial loading of the first and second load rings 121, 122, respectively.

The first load ring 121 is compressed such that it engages the load ring engagement surface 130 of the first collar 44 and the inclined loading surface 134 of the first seal ring 111. The second load ring 122 is compressed such that it engages the load ring engagement surface 130 of the bushing 42 and the inclined loading surface 134 of the second seal ring 112. The first and second load rings 121, 122 are positioned such that they resiliently support the first and second seal rings 111, 112 and drive the sealing faces 136 of the first and second seal rings 111, 112 together to define a band 142 of contact between the sealing bands 140. The first and second load rings 121, 122 act in the manner of a spring to apply an axial load respectively against the first and second seal rings 111, 112 in opposing directions along the longitudinal axis "LA" to bring the sealing faces 136 of the first and second seal rings 111, 112 into face-to-face sealing contact under pressure along the band 142 of contact such that a running, fluid-tight seal is formed.

The first and second seal rings 111, 112 are rotationally movable with respect to each other about the longitudinal axis "LA." In this arrangement, the first seal ring 111 can be considered a stationary seal ring as it is rotatively coupled with the first collar 44. The second seal ring 112 can be considered a rotational seal ring as it is coupled with the bushing 42 and can rotate relative to the pin 40.

The load ring engagement surfaces 130 of the first collar 44 and the bushing 42 are mirror images. The inclined loading surfaces 134 of the first and second seal rings 111, 112 are substantially identical to each other. Accordingly, it should be understood that the description below of the load ring engagement surface 130 of the first collar 44 and the inclined loading surface 134 of the first seal ring 111 is applicable respectively to the load ring engagement surface 130 of the bushing 42 and the inclined loading surface 134 of the second seal ring 112, as well.

The load ring engagement surface 130 of the first collar 44 and the inclined loading surface 134 of the first seal ring 111 are in confronting, spaced apart relationship such that they define an annular load ring cavity 144 within which the first load ring 121 is disposed. The load ring engagement surface 130 of the first collar 44 and the inclined loading surface 134 of the first seal ring 111 cooperate together to define a seal end restriction 148 adjacent the sealing face 136 of the first seal ring 111. The seal end restriction 148 is configured to help prevent the first load ring 121 from sliding axially off of the first seal ring 111 in a direction toward the second seal ring 112 and to help prevent the first load ring 121 from extending into a pinch point therein.

The load ring engagement surface 130 of the first collar 44 extends axially from an inner end face 154 thereof and faces radially inwardly. The load ring engagement surface 130 of the first collar 44 includes a peripheral retaining lip 160 adjacent the inner end face 154 of the first collar 44 and an inclined load ramp portion 162. The inclined load ramp portion 162 is bounded by a seal end 166 adjacent the retaining lip and a load end 167 disposed in spaced axial relationship to the seal end 166.

The peripheral retaining lip 160 projects radially inwardly relative to the seal end 166 of the inclined load ramp portion 162. The peripheral retaining lip 160 cooperates with the outer perimeter 138 of the sealing face 136 of the first seal ring 111 to define the seal end restriction 148. A transition segment 174 can be provided between the peripheral retaining lip 160 and the seal end 166 of the inclined load ramp portion 162.

The inclined load ramp portion 162 is bounded at the seal end 166 by the transition segment 174. The load end 167 of the inclined load ramp portion 162 is in distal relationship with respect to the sealing face 136 of the first seal ring 111. The inclined load ramp portion 162 is substantially frusto-conical and is inclined at a predetermined load ramp angle "θ" relative to the longitudinal axis "LA" such that the seal end 166 of the inclined load ramp portion 162 is disposed radially outwardly of the load end 167 thereof.

The inclined loading surface 134 of the first seal ring 111 faces radially outwardly and includes a seating portion 202, an inclined seal ramp portion 204, and a cylindrical portion 206. The inclined seal ramp portion 204 is disposed between the seating portion 202 and the cylindrical portion 206.

The seating portion 202 projects radially outwardly relative to the inclined seal ramp portion 204 and terminates at the outer perimeter 138 of the sealing face 136. The seating portion 202 radially overlaps with the band 142 of contact between the sealing faces 136. The seating portion 202 is generally concave and can be adapted to surroundingly engage the first load ring 121.

The inclined seal ramp portion 204 of the first seal ring 111 is bounded at a seal end 220 by the seating portion 202 and at a load end 222 by the cylindrical portion 206. The load end 222 of the inclined seal ramp portion 204 is in distal relationship with respect to the sealing face 136 of the first seal ring 111. The inclined seal ramp portion 204 is substantially frusto-conical and is inclined at a seal ramp angle "γ" relative to the longitudinal axis "LA" such that the seal end 220 of the inclined seal ramp portion 204 is disposed radially outwardly of the load end 222 thereof. The seal ramp angle "γ" of the inclined seal ramp portion 204 of the first seal ring 111 can be substantially equal to the load ramp angle "θ" of the inclined load ramp portion 162 of the first collar 44. In other embodiments, the seal ramp angle "γ" of the inclined seal ramp portion 204 of the first seal ring 111 can be greater than the load ramp angle "θ" of the inclined load ramp portion 162 of the first collar 44. In other embodiments, the seal ramp angle "γ" of the inclined seal ramp portion 204 of the first seal ring 111 can have a different relationship with respect to the load ramp angle "θ" of the inclined load ramp portion 162 of the first collar 44.

The cylindrical portion 206 of the first seal ring 111 includes an external sidewall 225 that is substantially cylindrical and coaxial with the longitudinal axis "LA." The external sidewall 225 defines an outer perimeter 230 of a load end 232 of the first seal ring 111 to define a load end restriction 233 in cooperation with the first collar 44.

Figure 5:
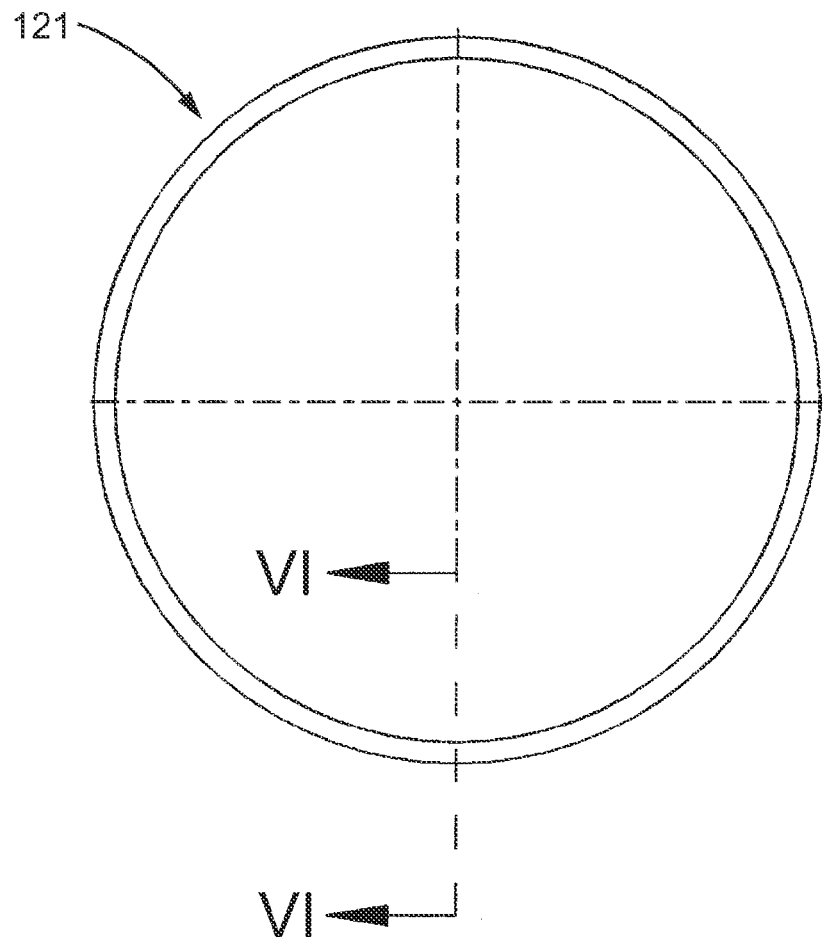
FIG. 5 is an axial end view of a load ring of the seal assembly of FIG. 4.
Figure 6:
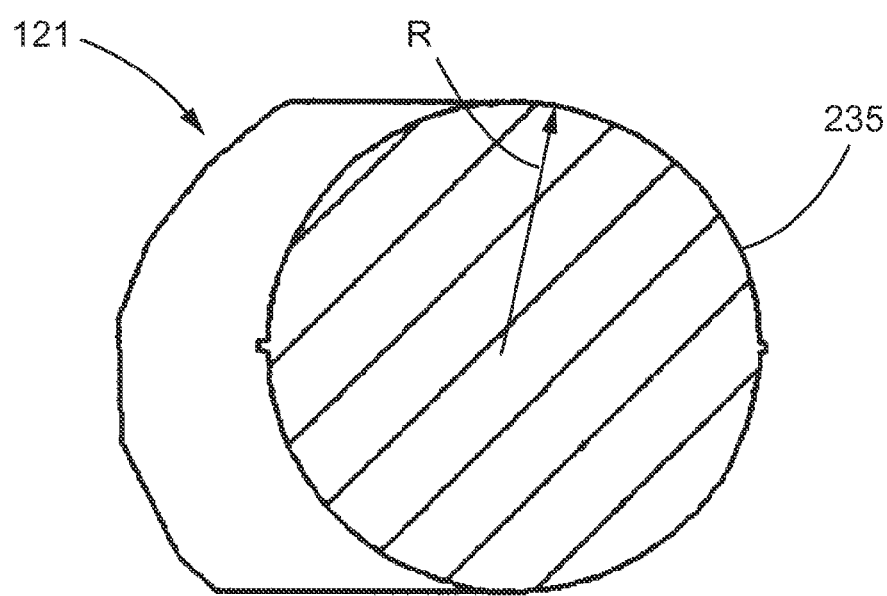
FIG. 6 is an enlarged, cross-sectional view, shown in perspective, taken along line VI-VI in FIG. 5.

Referring to FIGS. 5 and 6, the first load ring 121 is shown. The first and second load rings 121, 122 are substantially identical to each other. It should be understood, therefore, that the description of the first load ring 121 is applicable to the second load ring 122. When the first load ring 121 is not compressed, it has a substantially circular cross-sectional shape 235, as shown in FIG. 6. The circular cross-sectional shape when in an unloaded condition has a predetermined radius "R" (see FIG. 6).

Referring to FIGS. 7-10, the first seal ring 111 is shown. The first seal ring 111 is an example of a seal ring constructed according to principles of the present disclosure. The second seal ring 112 is substantially identical to the first seal ring 111. It should be understood, therefore, that the description of the first seal ring 111 is applicable to the second seal ring 112, as well. The first seal ring 111 includes a cylindrical body 240 (FIG. 9) and the sealing flange 137.

Referring to FIGS. 7 and 8, the sealing flange 137 includes the sealing face 136. The sealing face 136 includes the sealing band 140 disposed adjacent the outer perimeter 138 of the sealing flange 137 and an inner relieved area 245 disposed between the sealing band 140 and an inner perimeter 248 of the first seal ring 111. The inner relieved area 245 is tapered between the sealing band 140 and the inner perimeter 248 such that the inner perimeter 248 is axially displaced from the sealing band 140 (see FIG. 4).

The sealing band 140 is brush polished such that the sealing band 140 has a surface roughness average of about 0.08 micrometers Ra or less. In other embodiments, the sealing band 140 can be brush polished such that the sealing band 140 has a surface roughness average of about 0.06 micrometers Ra or less. The surface roughness average can be computed using techniques known to those skilled in the art. For example, in one arrangement, the surface roughness average (Ra) of the sealing band 140 can be determined using a profilometer set up with a 0.25 mm cutoff and evaluated for five cutoff lengths. The first seal ring 111 can be checked in at least three locations at predetermined locations and/or about 120° radially apart.

Figure 9:
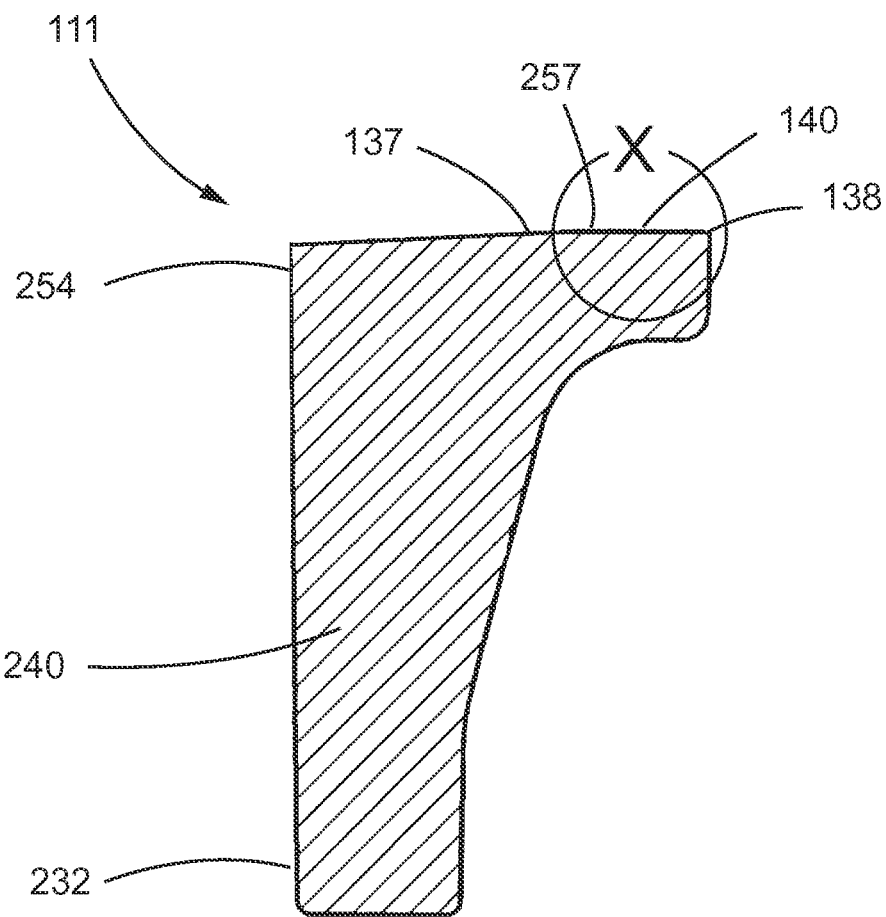
FIG. 9 is an enlarged, cross-sectional view taken along line IX-IX in FIG. 7.

Referring to FIG. 9, the cylindrical body 240 extends axially between the load end 232 and a seal end 254 in opposing relationship to the load end 232. The sealing flange 137 is disposed adjacent the seal end 254 of the cylindrical body 240. The sealing flange 137 projects radially from the cylindrical body 240 to the outer perimeter 138 thereof. The sealing band 140 can be substantially flat in cross-section between an inner radial edge 257 and the outer perimeter 138.

Figure 10:
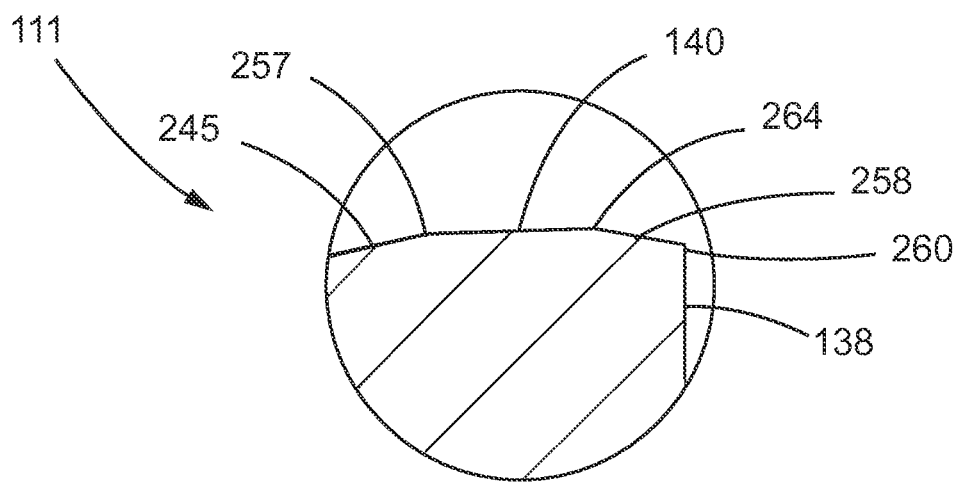
FIG. 10 is an enlarged, fragmentary view of the seal ring of FIG. 7 corresponding to the location encompassed by circle X in FIG. 9.

Referring to FIG. 10, the inner radial edge 257 comprises a transition radius that is disposed between the sealing band 140 and the inner relieved area 245. The transition radius of the inner radial edge 257 can comprise, in embodiments, a substantially consistent radius from a taper angle of the inner relieved area 245 to a planar portion of the sealing band 140.

In some embodiments, the sealing band 140 can be disposed adjacent the outer perimeter 138 and include an outer relieved area 258. The illustrated outer relieved area 258 is chamfered or tapered between the sealing band 140 and the outer perimeter 138 such that an outer perimeter edge 260 is axially displaced from the sealing band 140. The sealing band 140 can be substantially flat in cross-section between an inner radial edge 257 and an outer radial edge 264. The outer radial edge 264 can comprise a substantially-consistent transition radius.

Figure 11:
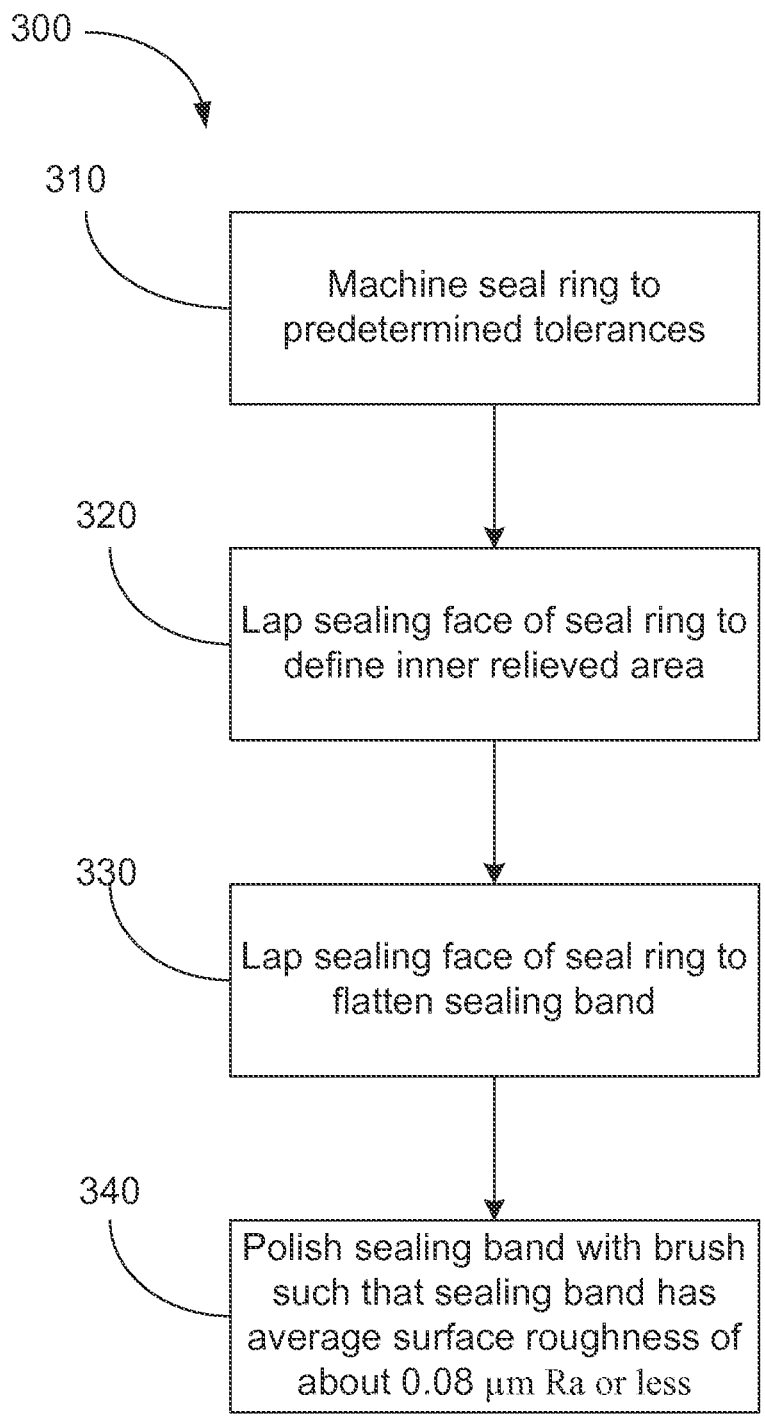
FIG. 11 is a flow chart illustrating steps of an embodiment of a method for preparing a seal ring for a seal assembly according to principles of the present disclosure.

Referring to FIG. 11, steps of an embodiment of a method 300 for preparing a seal ring for a seal assembly in accordance with principles of the present disclosure are shown. The seal ring is machined to at least one predetermined tolerance (step 310). The sealing face of the seal ring is lapped to define an inner relieved area (step 320). The sealing face of the seal ring is lapped to flatten a sealing band (step 330). The sealing band is polished with a brush such that the sealing band has a surface roughness average of about 0.08 micrometers Ra or less (step 340).

The sealing ring can be made by any suitable technique, such as by being stamped and formed, cast, or forged, for example. In step 310, the seal ring can be machined by any suitable technique, such as by using a lathe for lathe-turning and/or grinder for grinding operations, for example. The seal ring can be machined such that the thickness of the seal flange is within a predetermined tolerance, the seal ramp angle is within a predetermined tolerance, and other dimensional tolerances are met, for example.

In step 320, the sealing face can be lapped with a spherical lap to define the inner relieved area. In step 330, the sealing face can be lapped with a flat lap to flatten the sealing band.

In embodiments, the sealing band can be polished in step 340 with a brush such that the sealing band has a surface roughness average of about 0.06 micrometers Ra or less. In embodiments, in step 340, the sealing band is polished with a brush including a disk and bristles extending from the disk.

The bristles of the brush can be impregnated with an abrasive. In some embodiments, the brushes can include nylon bristles impregnated with abrasive grit. In other embodiments, a brush include bristles made from natural materials and has a diamond paste applied thereto. The abrasive can be at least one of diamond, aluminum oxide, and carbide, for example.

In embodiments, in step 340, the brush can be rotated about a rotary axis defined by a central region of the disk. At least one of the brush and the seal ring can be moved with respect to the other along a transverse plane intersecting the rotary axis. At least one of the brush and the seal ring can be moved relative to the other along the transverse plane. The brush and the seal ring can be moved relative to each other such that the sealing band has a random polish.

Brushing and polishing machines, such as those commercially-available from René Gerber AG Maschinenbau of Switzerland, are examples of machines suitable for performing the polishing step 340. In other embodiments, other suitable machines can be employed. In some embodiments, the brushing and polishing machine can include a single rotary brush. In other embodiments, the brushing and polishing machine can include multiple rotary brushes (e.g., three).

The seal ring being machined can be placed in a disk-shaped work piece holder. A rotary-disk brush can brush the work pieces from above by applying a defined work pressure along its rotary axis while the brush rotates about the rotary axis. The seal ring can rotate on a planetary polishing table, with the entire polishing table oscillating and/or rotating under the rotating brush. The relative movement of the polishing table and the rotary-disk brush with polishing agent can produce substantially evenly-radiused edges all the way around and polish the surfaces brushed by the brush. Different contours, shapes and surface roughness can be achieved by changing the following parameters: brush material, brush density, brush speed, work pressure and work time as well as polishing agent. In some embodiments, the work piece holder can rotate about a central axis and the polishing table can reciprocally translate.

Industrial Applicability

The industrial applicability of the embodiments of a pin joint provided with a seal assembly described herein will be readily appreciated from the foregoing discussion. The described principles are applicable to machines and equipment including a pivotal linkage arrangement between a pair of members such that one member is rotatably movable with respect to the other member. A pin joint having at least one seal assembly constructed in accordance with the present principles can be used to provide the pivotal linkage. Examples of such machines include compaction machines, including a wheel loader, for example. The seal assemblies disclosed herein can advantageously be offered on new equipment, or can be used to retrofit existing equipment operating in the field.

During use, the pin 40 of the pin joint assembly 24 can be held stationary by the first and second collars 44, 45. The bushing 42 can rotate about the longitudinal axis "LA" while engaging the pin 40 and the first and second sleeve bearings 91, 92. The first and second sleeve bearings 91, 92, in turn, rotate about the longitudinal axis "LA" while engaging the bushing 42 and the pin 40.

The first and second seal assemblies 51, 52 help prevent lubricant (not shown) from leaking out of the channels 85, 86, respectively. Specifically, the first and second seal rings 111, 112 of each of the first and second seal assemblies 51, 52 rotate against one another in sealing engagement. The first and second load rings 121, 122 of each of the first and second seal assemblies 51, 52 act in the manner of a spring to apply an axial load respectively against the first and second seal rings 111, 112 in opposing directions along the longitudinal axis "LA" to bring the sealing bands 140 of the first and second seal rings 111, 112 of each of the first and second seal assemblies 51, 52 into face-to-face sealing contact under pressure such that a running fluid-tight seal is formed. The structure of each of the first and second seal assemblies 51, 52 maintains the first and second load rings 121, 122 in proximal relationship to the first and second seal rings 111, 112, respectively, to promote the opposing axial forces exerted by the first and second seal rings 111, 112 against each other. Accordingly, lubricant (not shown) can be restrained from escaping the first and second channels 85, 86 and the first and second subassemblies 101, 102 under difficult loading conditions.

Each of the first and second seal assemblies 51, 52 provides a running seal. Construction of the sealing bands 140 is such that an effective fluid tight seal can be produced readily upon installation of the first and second seal rings 111, 112 in a joint with substantially no wear-in period required. The sealing bands 140 can have a consistent surface finish with a smooth radius between the sealing band 140 and the inner relieved area 245. The outside diameter of the first and second seal rings 111, 112 can be substantially burr-free.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A seal assembly adapted for use in sealing a joint having a first member pivotable about a rotational axis relative to a second member thereof, the seal assembly comprising:
    first and second annular seal rings, the first and second annular seal rings each having a loading surface extending axially and a sealing face extending radially to an outer perimeter, each sealing face having a sealing band disposed adjacent the outer perimeter, the first and second annular seal rings abutting one another such that the sealing band of the first annular seal ring is in contacting relationship with the sealing band of the second annular seal ring; and
    first and second annular load rings, the first annular load ring engaging the loading surface of the first annular seal ring, the second annular load ring engaging the loading surface of the second annular seal ring;
    wherein each sealing band is brush polished such that the sealing band has a surface roughness average of about 0.08 micrometers Ra or less.

2. The seal assembly according to claim 1, wherein the sealing band of each of the first and second annular seal rings is brush polished such that the surface roughness average of each sealing band is about 0.06 micrometers Ra or less.

3. The seal assembly according to claim 1, wherein the sealing band of each of the first and second annular seal rings is substantially flat in cross-section between an inner radial edge and the outer perimeter.

4. The seal assembly according to claim 3, wherein the sealing face of each of the first and second annular seal rings includes an inner relieved area disposed between the sealing band and an inner perimeter, each inner relieved area being tapered between the sealing band and the inner perimeter such that the inner perimeter is axially displaced from the sealing band.

5. The seal assembly according to claim 4, wherein a transition radius is disposed between the sealing band and the inner relieved area of each of the first and second annular seal rings, and each transition radius has a consistent radius from a taper angle of the inner relieved area to the sealing band.

6. A seal ring for a seal assembly comprising:
a cylindrical body, the cylindrical body extending axially between a load end and a seal end;
a sealing flange, the sealing flange disposed adjacent the seal end of the cylindrical body, the sealing flange projecting radially from the cylindrical body to an outer perimeter of the sealing flange, the sealing flange including a sealing face, the sealing face having a sealing band disposed adjacent the outer perimeter of the sealing flange and an inner relieved area disposed between the sealing band and an inner perimeter of the sealing flange;
wherein the sealing band is brush polished such that the sealing band has a surface roughness average of about 0.08 micrometers Ra or less.

7. The seal ring for a seal assembly according to claim 6, wherein the sealing band is brush polished such that the surface roughness average of the sealing band is about 0.06 micrometers Ra or less.

8. The seal ring for a seal assembly according to claim 6, wherein the sealing band is substantially flat in cross-section between an inner radial edge and the outer perimeter.

9. The seal ring for a seal assembly according to claim 8, wherein the inner relieved area is tapered between the sealing band and the inner perimeter such that the inner perimeter is axially displaced from the sealing band.

10. The seal ring for a seal assembly according to claim 9, wherein a transition radius is disposed between the sealing band and the inner relieved area, and the transition radius has a consistent radius from a taper angle of the inner relieved area to the sealing band.

11. A method for preparing a seal ring for a seal assembly, the method for preparing comprising:
machining the seal ring to at least one predetermined tolerance;
lapping a sealing face of the seal ring to define an inner relieved area;
lapping the sealing face of the seal ring to flatten a sealing band;
and
polishing the sealing band with a brush such that the sealing band has a surface roughness average of about 0.08 micrometers Ra or less, the brush including a disk and bristles extending from the disk.

12. The method for preparing a seal ring for a seal assembly according to claim 11, wherein the sealing face is lapped with a spherical lap to define the inner relieved area.

13. The method for preparing a seal ring for a seal assembly according to claim 11, wherein the sealing face is lapped with a flat lap to flatten the sealing band.

14. The method for preparing a seal ring for a seal assembly according to claim 11, wherein the sealing band is polished with a brush such that the surface roughness average of the sealing band is about 0.06 micrometers Ra or less.

15. The method for preparing a seal ring for a seal assembly according to claim 11, wherein the bristles of the brush are impregnated with an abrasive.

16. The method for preparing a seal ring for a seal assembly according to claim 15, wherein the abrasive is at least one of diamond, aluminum oxide, and carbide.

17. The method for preparing a seal ring for a seal assembly according to claim 11, wherein the brush is rotated about a rotary axis defined by a central region of the disk, and at least one of the brush and the seal ring is moved with respect to the other along a transverse plane intersecting the rotary axis.

18. The method for preparing a seal ring for a seal assembly according to claim 17, wherein at least one of the brush and the seal ring is moved relative to the other along the transverse plane.

19. The method for preparing a seal ring for a seal assembly according to claim 17, wherein the brush and the seal ring are moved relative to each other such that the sealing band has a random polish.

* * * * *